United States Patent Office 3,549,643
Patented Dec. 22, 1970

3,549,643
4-AMINO-2-CARBETHOXYMETHYL-1,2,3,4-TETRAHYDROISOQUINOLINE
Franklyn W. Gubitz, Nassau, N.Y., assignor to Sterling Drug Inc., New York, N.Y., a corporation of Delaware
No Drawing. Application Jan. 9, 1969, Ser. No. 790,900, which is a division of application Ser. No. 459,884, May 28, 1965. Divided and this application May 20, 1969, Ser. No. 826,286
Int. Cl. C07d 35/54
U.S. Cl. 260—287                   1 Claim

ABSTRACT OF THE DISCLOSURE 1,2,3,4,5,8-hexahydro - 4 - substituted-1,5-methanobenzo[f][1,4]diazocines and 1,2,3,4,5,6-hexahydro-4-substituted-1,5-methanobenzo[g][1,4]diazocines, useful as analgesic antagonists, are prepared by reducing the corresponding 3-oxo compounds unsubstituted in the 4-position, and N-alkylating the 4-position. Said 3-oxo compounds are in turn prepared by pyrolytic cyclization of 4-amino - 2 - carbalkoxymethyl - 1,2,3,4 - tetrahydroisoquinolines and 3 - amino-1-carbalkoxymethyl - 1,2,3,4-tetrahydroquinolines.

---

This application is a division of my prior copending application Ser. No. 790,900, filed Jan. 9, 1969 now U.S. Pat. 3,494,923, which is in turn a division of my prior copending application Ser. No. 459,884, filed May 28, 1965, now U.S. Pat. 3,472,852.

This invention relates to derivatives of 1,2,3,4,5,8-hexahydro-1,5-methanobenzo[f][1,4]diazocine and 1,2,3,4,5,6-hexahydro-1,5-methanobenzo[g][1,4]diazocine and to the preparation of the same. More particularly, this invention relates to novel 1,2,3,4,5,8-hexahydro-4-substituted - 1,5-methanobenzo[f][1,4]diazocines and 1,2,3,4,5,6-hexahydro - 4 - substituted - 1,5 - methanobenzo[g]-[1,4]diazocines and to novel intermediates used in their preparation.

The new compounds of this invention have pharmacodynamic activity and are useful as antagonists of certain strong analgesic agents, such as morphine and meperidine.

The compounds of the invention are the 1,2,3,4,5,8-hexahydro-4-(R—CH$_2$—) - 1,5-methanobenzo[f][1,4]-diazocines and 1,2,3,4,5,6-hexahydro-4-(R—CH$_2$—)-1,5-methanobenzo[g][1,4]diazocines having the structural formulas

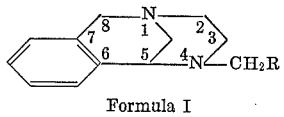

Formula I and

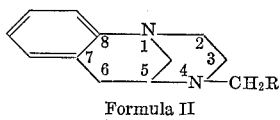

Formula II in which R is a member of the group consisting of: hydrogen; lower-alkyl; lower-alkenyl; cyclopropyl; and benzyl.

When the group R is lower alkyl there are included the monovalent radicals of relatively low molecular weight derived from saturated branched and unbranched aliphatic hydrocarbons; the preferred alkyl radicals have 1–5 carbon atoms as illustrated by, but not limited to, methyl, ethyl, isopropyl, n-butyl, pentyl. When R is lower alkenyl, there are included the monovalent lower molecular weight unsaturated aliphatic hydrocarbon radicals containing a double bond, and preferably having 2–5 carbon atoms, as illustrated by, but not limited to, —CH=CH$_2$, —CH=CHCH$_3$, —CH$_2$CH=CH$_2$, —CH=C(CH$_3$)$_2$, —CH=CHCH$_2$CH$_2$CH$_3$, —CH$_2$CH=CHCH$_2$CH$_3$, and the like.

The new 1,2,3,4,5,8-hexahydro - 4 - (R—CH$_2$—)-1,5-methanobenzo[f][1,4]diazocines and 1,2,3,4,5,6-hexahydro-4-(R—CH$_2$—) - 1,5 - methanobenzo[g][1,4]diazocines are conveniently prepared by N-alkylating the corresponding secondary amines, namely 1,2,3,4,5,8-hexahydro-1,5-methanobenzo[f][1,4]diazocine and 1,2,3,4,5,6-hexahydro - 1,5 - methanobenzo[g][1,4]diazocine, by heating with an alkylating agent having the formula R—CH$_2$—An, where R has the same meaning indicated hereinabove and An is the anion of a strong organic or inorganic acid, for instance a reactive halide or an arylsulfonate, e.g., a tosylate in the presence of an acid-absorbing medium for instance an alkali metal carbonate or hydroxide, for instance sodium hydroxide. This alkylation reaction is preferably carried out in the presence of a suitable reaction medium such as an N,N-(di-lower alkyl)-lower alkanamide, for instance N,N-dimethylformamide or N,N-dimethylacetamide or a lower alkanol, for instance methanol or ethanol.

Another method suitable for preparing the new compounds of the invention comprises N-acylating the 1,2,3,4,5,8-hexahydro - 1,5 - methanobenzo[f][1,4]diazocine or 1,2,3,4,5,6 - hexahydro - 1,5 - methanobenzo[g][1,4]-diazocine with an acid halide or acid anhydride of an acid having the formula RCOOH and reducing the resulting N—(CO—R) derivative with a reducing agent effective to reduce the carbonyl of the amide to —CH$_2$—, for instance lithium aluminum hydride or equivalent thereof.

The 1,2,3,4,5,8 - hexahydro-1,5-methanobenzo[f][1,4]-diazocine and 1,2,3,4,5,6-hexahydro-1,5-methanobenzo-[g][1,4]diazocine starting materials for the preparation of the compounds of the invention can be obtained by reducing the corresponding amides namely 1,2,5,8-tetrahydro-4-oxo-1,5-methanobenzo[f][1,4]diazocine and 1,2,5,6-tetrahydro - 4 - oxo - 1,5 - methanobenzo[g][1,4]-diazocine having the formulas

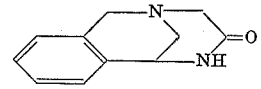

Formula III and

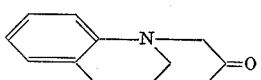

Formula IV respectively, with a reducing agent effective to reduce the carbonyl of the amide to —CH$_2$—, for instance lithium aluminum hydride or equivalent thereof.

The novel cyclic amides of Formulas III and IV are also withiln the purview of the invention and are preferably prepared by heating at from 180° C. to 200° C. novel 4-amino-2-carbalkoxymethyl-1,2,3,4 -tetrahydroisoquinolines (V) and 3-amino-1-carbalkoxymethyl-1,2,3,4-tetrahydroquinolines (VI) respectively, to ring close with the elimination of an alkanol.

Compounds V and VI are prepared from 4-aminoisoquinoline and 3-aminoquinoline by the following sequence of reactions wherein the preparation of (V) is illustrated but which applies as well to the preparation of (VI) from 3-aminoquinoline:

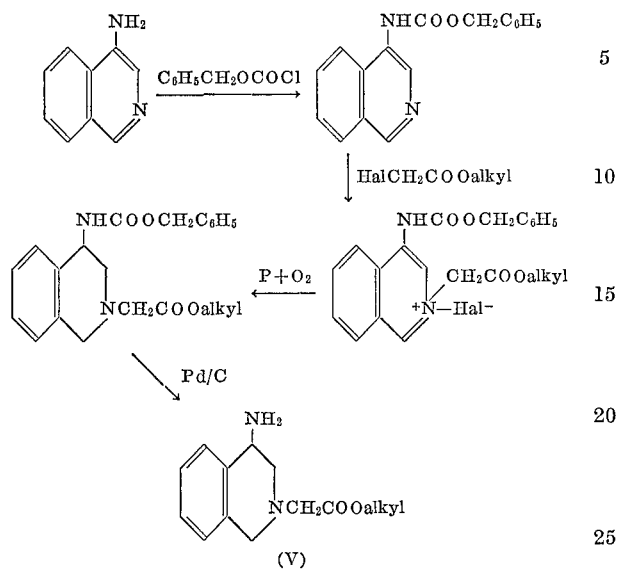

In the above flow sheet the amino group of 4-aminoisoquinoline is blocked by any group conventionally used to protect amino groups, for instance lower alkanoyl to give for example 4-formamidoisoquinoline or as illustrated carbobenzoxy. The carbobenzoxyamino compound is quaternized with an alkyl haloacetate to give the appropriate isoquinolinium compound which is reduced over platinum oxide to the 1,2,3,4-tetrahydro compound. The protective grouping is then removed by reduction over a palladium on charcoal catalyst or by other procedures known to those skilled in the art, to give the desired amino compound V.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. In practising the invention, it has been found convenient to form the hydrochloride or nitrate salt. However, other appropriate pharmacologically acceptable salts within the scope of the invention are those derived from mineral acids such as hydrobromic acid, hydriodic acid, nitric acid, phosphoria acid, sulfamic acid and sulfuric acid; and organic acids such as acetic acid, citric acid, tartari acid, lacti acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion exchange procedures.

The structures of the compounds of this invention followed from the methods of synthesis which were used and from the elementary analyses of the products obtained.

The invention is illustrated by the following examples without, however, being limited thereto.

EXAMPLE 1

1,2,3,4,5,6-hexahydro-4-methyl-1,5-methanobenzo [g][1,4] diazocine

A mixture of 16.1 g. of 1,2,3,4,5,6-hexahydro-1,5-methanobenzo[g][1,4]diazocine and 50 ml. of formic acid was cooled to 27° C. and 30 ml. of 35–40% formaldehyde added dropwise. After the temperature rose spontaneously to 58° C. the mixture was heated to 85–90° C. for one hour with stirring. The excess reactants were removed by distillation, the residual oil treated with sodium hydroxide solution and the mixture triturated with ether. The ether extracts were dried and the ether removed by evaporation to give a yellow oil. Distillation of the oil under diminished pressure gave 8.7 g. of 1,2,3,4,5,6 - hexahydro-4-methyl-1,5-methanobenzo [g][1,4]diazocine, B.P. 129–131° C./8 mm. and having the molecular formula $C_{12}H_{16}N_2$. The free base was treated with 12 ml. of 2 N nitric acid and the mixture taken up in an ethanol-benzene solution and cooled. The crystals thus obtained were collected by filtration, recrystallized from methanol and dried in vacuo. There was thus obtained 11 g. of the nitrate salt of 1,2,3,4,5,6-hexahydro - 4 - methyl - 1,5 - methanobenzo[g][1,4]diazocine, M.P. 120–121° C.

EXAMPLE 2

1,2,3,4,5,8-hexahydro-4-methyl-1,5-methanobenzo [f][1,4]diazocine

Following a procedure similar to that described in Example 1 hereinabove, 17.4 g. 1,2,3,4,5,8 - hexahydro - 1,5-methanobenzo[g][1,4]diazocine was alkylated with 50 ml. of formic acid and 30 ml. of 37% formaldehyde to yield 14 g. of 1,2,3,4,5,8-hexahydro-4-methyl-1,5-methanobenzo[f][1,4]diazocine, having the molecular formula $$C_{12}H_{16}N_2$$

This base was converted to its hydrochloride, a white crystalline powder which weighed 16.6 g. and melted at 283–285° C. (dec.).

EXAMPLE 3

1,2,3,4,5,8-hexahydro-4-allyl-1,5-methanobenzo[f][1,4] diazocine

A mixture of 8.7 g. of 1,2,3,4,5,8 - hexahydro - 1,5-methanobenzo[f][1,4]diazocine and 6.1 g. of allyl bromide in 125 ml. of dimethylformamide was refluxed overnight. The solvent was removed by vacuum distillation and the residue taken up in sodium hydroxide solution and the mixture extracted with other. The ether extracts were dried over anhydrous sodium sulfate and the ether removed. The residual oil was distilled to yield 6.7 g. of 1,2,3,4,5,8 - hexahydro - 4 - allyl - 1,5 - methanobenzo [f][1,4]diazocine, having the molecular formula $$C_{14}H_{18}N_2$$

and boiling at 160–164° C./20 mm. This base was converted to its dihydrochloride salt, a white blade-like solid which melted at 231–234° C. and to its dinitrate salt, a white solid which melted at 162–164° C.

EXAMPLE 4

1,2,3,4,5,6-hexahydro-4-allyl-1,5-methanobenzo[g][1,4] diazocine

Following a procedure similar to that described in Example 3, 3.5 g. of 1,2,3,4,5,6-hexahydro - 1,5 - methanobenzo[g][1,4]diazocine was N-alkylated with 2.4 g. of allyl bromide to yield 1,2,3,4,5,6-hexahydro-4-allyl-1,5- methanobenzo[g][1,4]diazocine, having the molecular formula $C_{14}H_{18}N_2$. This base was converted to its dihydrochloride, colorless prisms which melted at 239° C. (dec.).

EXAMPLE 5

1,2,3,4,5,8-hexahydro-4-cyclopropylmethyl-1,5-methanobenzo[f][1,4]diazocine (A) A solution of 3.5 g. 1,2,3,4,5,8 - hexahydro - 1,5-methanobenzo[f][1,4]diazocine in an ether-alcohol mixture was treated with an excess of cyclopropanecarboxylic acid chloride and the mixture refluxed for several hours. The excess acid chloride was removed by distillation and the solid which separated was collected by filtration then dissolved in water. The aqueous solution was treated with a saturated potassium carbonate solution and extracted with chloroform. The chloroform extracts were dried, the chloroform removed and the residue left standing at room temperature. The crystals which precipitaed were collected, recrystallized from ether-acetone to give 1,2,3,4,5,8-hexahydro - 4 - cyclopropanecarbonyl -1,5 - methanobenzo[f][1,4]diazocine, having the molecular formula $C_{15}H_{18}N_2O$ and melting at 97–103° C.

(B) The amide from (A) (2.4 g.) was reduced by heating to reflux with 1.1 g. of lithium aluminum hydride in 50 ml. of tetrahydrofuran. The hydride complex was decomposed with 3 ml. of water and the mixture filtered. The colorless filtrate was evaporated on a steam bath to yield a pale yellow oil which was 1,2,3,4,5,8-hexahydro-4-cyclopropylmethyl - 1,5 - methanobenzo[f][1,4]diazocine, having the molecular formula $C_{15}H_{20}N_2$. This base was converted to its dihydrochloride salt, a white solid which, after recrystallization from methanol, melted at 267–268° C. (dec.).

EXAMPLE 6

1,2,3,4,5,8-hexahydro-4-phenylethyl-1,4-methanobenzo [f][1,4]diazocine (A) A mixture of 7 g. of 1,2,3,4,5,8-hexahydro-1,5-methanobenzo[f][1,4]diazocine and 6.75 g. of phenylacetyl chloride in 30 ml. of 10% sodium hydroxide was shaken vigorously then allowed to cool. The oil which separated was extracted with ether, the ether extracts dried and the ether removed by evaporation. There was thus obtained 1,2,3,4,5,8 - hexahydro-4-phenylacetyl-1,5-methanobenzo[f][1,4]diazocine.

(B) The amide from Part A was reduced with lithium aluminum hydride following ap procedure similar to that described in Example 5(B) to give the free base 1,2,3,4,5,8-hexahydro - 4 - phenylethyl - 1,5 - methanobenzo[f][1,4]diazocine, having the molecular formula $C_{19}H_{22}N_2$. This base was converted to its dihydrochloride, a white powder which melted at 239–245° C.

The following are further illustrative examples of the compounds of Formulas I and II which are obtained by proceeding in according with the methods hereinabove described.

1,2,3,4,5,6-hexahydro-4-cyclopropylmethyl-1,5-methanobenzo[g][1,4]diazocine;
1,2,3,4,5,8-hexahydro-4-pentyl-1,5-methanobenzo [f][1,4]diazocine;
1,2,3,4,5,8-hexahydro-4-dimethylallyl-1,5-methanobenzo [f][1,4]diazocine;
1,2,3,4,5,6-hexahydro-4-phenylethyl-1,5-methanobenzo [g][1,4]-diazocine;
1,2,3,4,5,6-hexahydro-4-dimethylallyl-1,5-methanobenzo[g][1,4]diazocine;
1,2,3,4,5,6-hexahydro-4-pentyl-1,5-methanobenzo[g] [1,4]diazocine;
1,2,3,4,5,8-hexahydro-4-hexenyl-1,5-methanobenzo [f][1,4]diazocine;
1,2,3,4,5,8-hexahydro-4-sec. butyl-1,5-methanobenzo [f][1,4]diazocine;
1,2,3,4,5,8-hexahydro-4-(3-methyl-2-butenyl)-1,5-methanobenzo[f][1,4]diazocine;
1,2,3,4,5,6-hexahydro-4-(3-methyl-2-butenyl)-1,5-methanobenzo[g][1,4]diazocine;
1,2,3,4,5,6-hexahydro-4-(3-methylbutyl)1,5-methanobenzo[g][1,4]diazocine.

Compounds of Formulas I and II hereinabove which were prepared as described in the foregoing examples were found to be antagonists of certain strong analgesics. Thus, when tested in rats by a modified D'Amour-Smith test procedure and in dogs, they were found to be antagonists of the analgesic activity of morphine and meperidine. In this test procedure, when the compounds of this invention were administered prior to or simultaneously with administration of morphine or meperidine, the expected analgesic effect of the latter was decreased with increasing dosage levels of the former to a point where no analgesic effect was obtained. And when the new compounds were administered after the administration of morphine or meperidine, the analgesic effect was diminished or terminated, depending on the dosage levels involved. For example representative compounds of this invention, each in the form of an aqueous solution of an acid-addition salt, were administered subcutaneously to rats to determine the dosage level in terms of weight of antagonist per kilogram of body weight of the animal, which caused reduction of the analgesic effect of a 60 mg./kg. dose of meperidine hydrochloride by approximately 50 percent, so that the analgesic effect produced by the combination of the antagonist and the meperidine hydrochloride was substantially the same as the analgesic effect produced by a 30 mg./kg. dose of meperidine hydrochloride alone. Thus results thus obtained for each of the indicated compounds were as follows: 1,2,3,4,5,8-hexahydro-4-allyl - 1,5 - methanobenzo[f][1,4]diazocine, 28 mg./kg.; 1,2,3,4,5,8-hexahydro - 4 - phenylethyl-1,5-methanobenzo[f][1,4]diazocine, 10 mg./kg.; and 1,2,3,4,5,6-hexahydro-4-allyl - 1,5 - methanobenzo[g][1,4]diazocine, 25 mg./kg.

In addition to having antagonistic activity toward morphine and meperidine 1,2,3,4,5,8-hexahydro-4-allyl-1,5-methanobenzo[f][1,4]diazocine and 1,2,3,4,5,8 - hexahydro-4-phenylethyl - 1,5 - methanobenzo[f][1,4]diazocine were found to have psychomotor depressant properties, an activity found in 1,2,3,4,5,6-hexahydro-4-methyl-1,5-methanobenzo[g][1,4]diazocine, 1,2,3,4,5,8 - hexahydro-1,5-methanobenzo[f][1,4]diazocine, and 1,2,3,4,5,8-hexahydro - 4 - cyclopropylmethyl-1,5-methanobenzo-[f][1,4]diazocine.

Intermediates

The preparation of the novel 1,2,3,4,5,8-hexahydro-1,5-methanobenzo[f][1,4]- and 1,2,3,4,5,6 - hexahydro-1,5-methanobenzo[g][1,4]diazocine starting materials and intermediates thereto is illustrated below.

(A) A mixture of 18.6 g. of 3-acetamidoquinoline and 18.4 g. of ethyl bromoacetate in 50 ml. of ethanol was heated on a steam bath until all the solvent had evaporated. The solid which separated was collected by filtration and dried to give 3-acetamido-1-carbethoxymethylquinolinium bromide, having the melting point 200–201° C. (dec.).

A solution of 149 g. of 3-acteamido-1-carbethoxymethylquinolinium bromide in 1600 ml. of methanol was hydrogenated over platinum oxide at an initial pressure of 150 p.s.i. The catalyst was removed by filtration and the solvent removed by vacuum distillation. The residue was made basic with saturated potassium carbonate and extracted with chloroform. The chloroform extracts were dried, the chloroform evaporated and the residue distilled to give a viscous liquid, B.P. 216–220° C./0.2 mm., which solidified upon standing. The solid was recrystallized several times from ethyl acetate to give 3-acetamido - 1 - carbethoxymethyl - 1,2,3,4, - tetrahydroquinoline, M.P. 109–112° C.

Dry hydrogen chloride gas was bubbled into a solution of 31 g. of 3-acetamido-1-carbethoxymethyl-1,2,3,4- tetrahydroquinoline in 300 ml. of methanol and the mixture refluxed for three hours then cooled. The solid which separated was removed by filtration and the filtrate made basic with saturated potassium carbonate solution then extracted with chloroform. The chloroform was removed by evaporation and the residue distilled to give 3-amino-1-carbethoxymethyl - 1,2,3,4 - tetrahydroquinoline, B.P. 125° C./0.09 mm. and having the molecular formula $C_{13}H_{18}N_2O_2$. The base was converted to the acetate salt, a white solid melting at 103° C.

3 - amino - 1 - carbethoxymethyl-1,2,3,4-tetrahydroquinoline was also prepared as follows: To a solution of 14.4 g. of 3-aminoquinoline in 150 ml. of pyridine was added with cooling 18 g. of carbobenzoxy chloride and the mixture stirred for one hour. The reaction mixture was poured into one liter of water and the solid which separated collected by filtration. This product, after recrystallization from isopropanol, melted at 199–201° C. and was 3 - carbobenzoxyaminoquinoline, having the molecular formula $C_{17}H_{14}N_2$. This compound (2.8 g.) was refluxed for two hours with 1.8 g. of ethyl bromoacetate in 50 ml. of anhydrous ethanol. Addition of dry ethyl ether caused the precipitation of a solid which was collected by filtration and dried. The 3-carbobenzoxyamino-1-carbethoxymethylquinolinium bromide thus obtained had a melting point of 166–170° C. (dec.) and the molecular formula $C_{21}H_{21}BrN_2O_4$. Reduction of 8.9 g. of this quaternary in 300 ml. of methanol over a platinum oxide catalyst followed by removal of the catalyst and evaporation of the solvent gave a pink solid which after three recrystallizations from ethanol gave white needles of 3-carbobenzoxyamino - 1 - carboethoxymethyl-1,2,3,4-tetrahydroquinoline, M.P. 111–114° C.

A solution of 48.7 g. of 3-carbobenzoxyamino-1-carbethoxymethyl-1,2,3,4-tetrahydroquinoline in 1600 ml. of ethanol was reduced over a palladium on charcoal catalyst. The catalyst was removed, the solvent evaporated and the residue basified with potassium carbonate solution. Extraction with chloroform followed by removal of the chloroform gave an oil which was the free base 3-amino-1-carbethoxymethyl-1,2,3,4-tetrahydroquinoline.

A mixture of 18.8 g. of 3-amino-1-carbethoxymethyl-1,2,3,4-tetrahydroquinoline and 500 ml. of Carbitol was heated to about 180° C. and the mixture refluxed overnight. The Carbitol was removed by vacuum distillation and the residue taken up in ether. The amide product, 1,2,5,6-tetrahydro-3-oxo - 1,5 - methanobenzo[g][1,4]diazocine, which separated melted at 202–203° C. and had the molecular formula $C_{11}H_{12}N_2O$. The base was converted to its hydrochloride salt which crystallized as white prisms melting at 268–272° C. (dec.).

To a cooled suspension of 17 g. of lithium aluminum hydride and 20 g. of aluminum chloride in 1000 ml. of tetrahydrofuran was added 21.1 g. of the above-mentioned amide in 1000 ml. of tetrahydrofuran and the mixture refluxed overnight. The metal complex was decomposed by the addition of 67 ml. of water and the solvent removed by distillation. The residual oil was distilled to give 16.1 g. of 1,2,3,4,5,6-hexahydro-1,5-methanobenzo[g][1,4]diazocine having the molecular formula $C_{11}H_{14}N_2$ and the boiling point 65–71° C./.04 mm.

(B) Following a procedure similar to that described hereinabove for the preparation of 3-carbobenzoxyaminoquinoline, 97.5 g. of 4-aminoisoquinoline and 117 g. of carbobenzoxy chloride in one liter of pyridine yielded 35 g. of 4-carbobenzoxyaminoisoquinoline having the molecular formula $C_{17}H_{14}N_2O_2$ and melting at 139–140° C.

Quaternization of this product with ethyl bromoacetate using a procedure similar to that described hereinabove for the preparation of 3-carbobenzoxyamino-1-carbethoxymethylquinolinium bromide gave, from 17.6 g., 7.4 g. of 2-carbethoxymethyl - 4 - carbobenzoxyaminoisoquinolinium bromide having the molecular formula $C_{21}H_{21}BrN_2O_4$ and the melting point 111–112° C. (dec.).

Reduction of this quaternary using a procedure similar to that described hereinabove for the corresponding quinoline compound there was obtained 4-amino-2-carbethoxymethyl-1,2,3,4-tetrahydroisoquinoline which was converted to its dihydrochloride salt, melting point 167–171° C. (dec.).

The free base 4 - amino-2-carbethoxymethyl-1,2,3,4-tetrahydroisoquinoline was heated to 180° C. at which point ethanol was liberated. The reaction mixture was cooled and allowed to stand. The solid which separated was collected by filtration and recrystallized from acetonitrile to yield 1,2,7,8-tetrahydro-3-oxo-1,5-methanobenzo[f][1,4]diazocine, having the molecular formula $C_{11}H_{12}N_2O$ and which melted at 165–167° C. This amide was converted to its hydrochloride salt which melted at 275–276° C.

The above amide (149 g.) was reduced with 120 g. of lithium aluminum hydride and 106 g. of aluminum chloride in eight liters of tetrahydrofuran using a procedure similar to that described above in (A). There was thus obtained 128 g. of 1,2,3,4,5,8-hexahydro-1,5-methanobenzo[f][1,4]diazocine having the molecular formula $C_{11}H_{14}N_2$ and which boiled at 163–173° C./13 mm. This free base was converted to its dihydrochloride salt which melted above 300° C.

I claim:
1. 4-amino-2-carbethoxymethyl - 1,2,3,4 - tetrahydroisoquinoline.

References Cited

UNITED STATES PATENTS

| 3,045,008 | 7/1962 | Lombardino | 260—288X |
| 3,420,818 | 1/1969 | Ott | 260—288X |

FOREIGN PATENTS

| 42/11,839 | 5/1967 | Japan | 260—268 |
| 43/18,904 | 8/1968 | Japan | 260—286 |

OTHER REFERENCES

Kametani et al., Chem. Pharm. Bull., vol. 13, pp. 295–99 (March 1965).

DONALD G. DAUS, Primary Examiner

UNITED STATES PATENT OFFICE
CERTIFICATE OF CORRECTION

Patent No. 3,549,643　　　　　　　Dated December 22, 1970

Inventor(s) Franklyn W. Gubitz

It is certified that error appears in the above-identified patent and that said Letters Patent are hereby corrected as shown below:

Column 3, line 15 (reaction sequence of Cpd.V) "P+O$_2$" should read --PtO$_2$--; line 60, "phosphoria" should read --phosphoric--; line 62, "tartari" should read --tartaric--; line 62, "lacti" should read --lactic--. Column 4, line 37, after "17.4 g." insert --of--; line 56, "other" should read --ether--. Column 5, line 7, after "3.5 g." insert --of--; line 36, "1,4" should read --1,5--; line 47, "ap" should read --a--. Column 6, line 31, "Thus" should read --The--. Column line 32, "carboethoxymethyl" should read --carbethoxymethyl--.

Signed and sealed this 18th day of April 1972.

(SEAL)
Attest:

EDWARD M. FLETCHER, JR.
Attesting Officer

ROBERT GOTTSCHALK
Commissioner of Patents